March 21, 1961 J. O. TRIMBLE 2,976,086
GIB, PARTICULARLY FOR FORMING DIES
Filed Jan. 24, 1958

INVENTOR
John O. Trimble
BY *Karl L. Schiff*
AGENT

United States Patent Office 2,976,086
Patented Mar. 21, 1961

2,976,086

GIB, PARTICULARLY FOR FORMING DIES

John O. Trimble, Havertown, Pa., assignor to The Budd Company, Philadelphia, Pa., a corporation of Pennsylvania Filed Jan. 24, 1958, Ser. No. 710,970

3 Claims. (Cl. 308—3)

The invention relates to wiper, heel or wear plates or gibs, which are commonly used for guiding relatively movable parts on each other. Such plates or gibs are particularly used between members of forming dies, which are slidable on each other.

The indicated type of plates or gibs, customarily made of carefully machined metal (mostly steel or bronze) plates, are expensive.

The aim of the invention is a considerable reduction of the cost for wiper plates or gibs, especially for situations not involving high specific pressures, in regard to the price of material to be used as well as in regard to their manufacture.

The invention consists in forming the wiper plates of a plastic material, a plastic having the characteristics of being non-seizing, of having a low coefficient of friction, of being preferably self-lubricating, of having a high impact strength, and of having a high heat distortion point, in combination with such a shape as to permit the convenient manufacture from the indicated type of material while affording satisfactory structural strength and good dimensional stability.

The novel plate has the general shape of a grid or honeycomb with all walls having approximately the same or similar wall thickness. This shape, as distinguished from a solid body, provides the necessary strength while being at the same time adapted for the peculiarities of plastic materials in regard to the forming, curing, dimensional stability, etc.

Among the known plastic materials nylon in general and hexamethylene-diamine-adipic acid in particular has proved outstandingly suitable for making the new plates on account of its low coefficient of friction, its easy formability and its great dimensional stability when shaped in accordance with the invention and properly cured which latter again is made possible by the novel shape of the plate which gives good access to all of its parts for the curing media. Another plastic, tetrafluoroethylene known under the proprietary name of "Teflon," is similarly well suited as nylon but is, at least for the present, considerably more expensive. Very useful as material for the new plates, and particularly attractive on account of its lower cost, is also linear polyethylene.

The above briefly outlined and further objects, advantages and features of the invention will be more fully understood from the embodiment illustrated in the attached drawing and described in the following.

Figure 1:
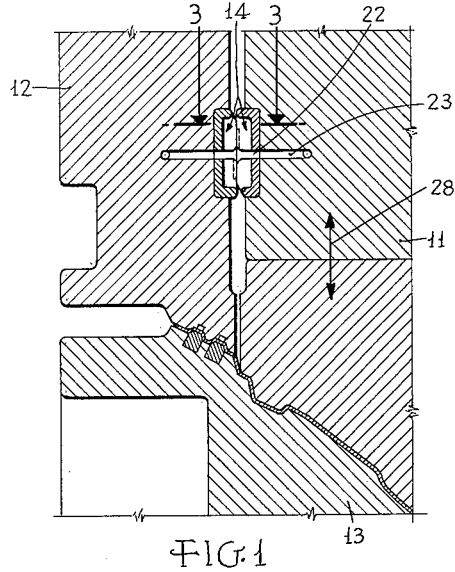
Fig. 1 is a fragmentary, diagrammatic section through a forming die equipped with the novel wiper plates.
Figure 2:
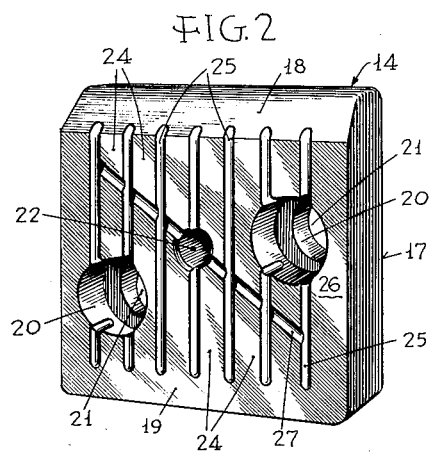
Fig. 2 is of a single wiper plate.
Figure 4:
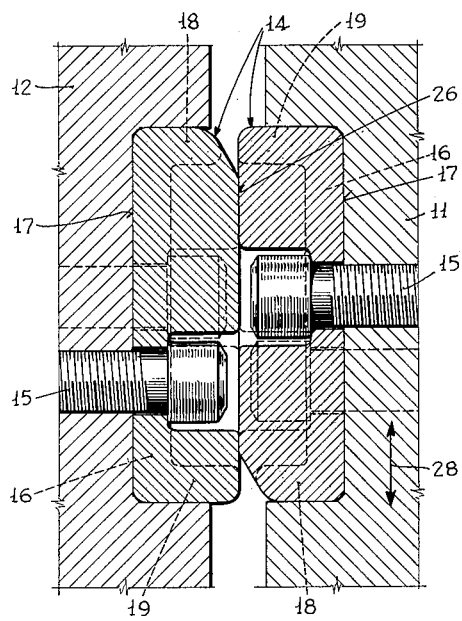
Fig. 4 is a fragmentary section, on the scale of and taken in plane 4—4 of Fig. 3.
Figure 3:
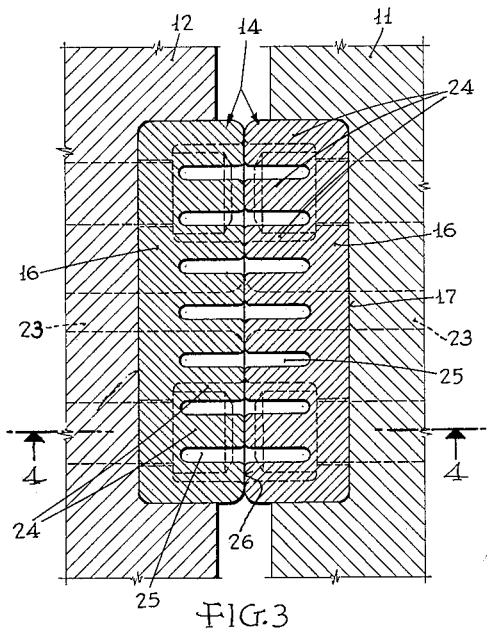
Fig. 3 is a fragmentary, larger-scale section of the die region including the wiper plates, the section being taken in plane 3—3 of Fig. 1.

The die, illustrated in Figs. 1, 3 and 4 comprises an upper die member or punch 11, a movable margin holder 12, and a lower die member and margin holder 13. As it is customary, punch 11 and margin holder 12 are slidably guided the one relative to the other with the help of gibs or wiper plates 14 which are attached by set screws 15.

Each gib or plate 14 is an injection molding which comprises a web or wall 16 with an attachment surface 17, marginal reinforcing walls 18 and 19, recessed portions or lugs 20 having holes 21 for the bolts 15 and a hole 22 communicating upon installation with grease supply conduits 23 in the dies 11 and 12, and a plurality of relatively thin walls 24, separated by slots 25 which extend vertically to walls 16, 18 and 19 and the free sides of which together with the free sides of walls 19 and 20 present a plane guide or bearing surface 26. The guide surface 26 exactly parallels the supporting or attachment surface 17. Lubricant distributing grooves 27 are formed in surface 26.

The subdivision of the plates by the slots 25 does not materially detract from the total area of the bearing surface 24 and does not interfere with the sliding of the plates on each other, particularly when, as shown in the drawing, the slots are arranged in the direction of relative movement as indicated by arrows 28 in Figs. 1 and 4.

All walls, that is the walls 16, 18, 19 and 24, have approximately the same or very similar thicknesses. Such subdivision of the wear plate into a plurality of portions of about equal thickness, which are separated from each other by the narrow slots 25 only, gives the plate approximately the strength of a solid plate, permits the formation of the plate by casting or injection molding from plastic to practically its ultimate dimensions, permits the thorough curing of the plate after it has been cast or molded, and assures great dimensional accuracy and stability of the plate once it has been formed and is subjected to the curing, to aging of the plastic material, and to the stresses of actual use.

After the new plate has been formed and cured, the accuracy of its dimensions may be increased by machining or grinding its surfaces particularly the guide surface 26 and in second place its attachment surface 17 which should exactly parallel the guide surface 26.

So as to appreciate the features of the invention it is pointed out that those plastics, which are particularly suited by their characteristics for wear plates, require extensive curing and that the efficiency of the curing depends on the ability of the curing medium to penetrate the form piece in depth. Nylon form pieces for instance require many hours of submersion in boiling water so as to reintroduce water in the chemical composition which had to be extracted therefrom so as to render the material formable.

The invention is not restricted to the specific embodiment shown in the attached print but is susceptible to modifications and adaptations. It should for instance be understood that, with minor modifications in regard to the attachment holes and the groove for the lubricant, the reverse arrangement might be used, in which the slotted side provides the attachment surface and the uninterrupted side the gliding surface. It should also be understood that different shapes and arrangements of the slots or of a multiplicity of holes may be used for obtaining a cored-out honeycomb, or grid structure with relatively thin walls, which complies with the requirements of plastic material as well as the requirements of strength dimensional stability and a sufficiently large area of the guide surface. It will also be understood that the new plates need not necessarily be used in pairs but that a single one of the new plates may be arranged for sliding movement on a plate or structure of another material or design.

What is claimed is:

1. A gib for guiding two members for sliding movement relative to each other, consisting of a molded plastic plate formed of a moldable plastic material including "nylon" and "Teflon" which are heat-curable in molds with depth-penetration of cure with time, the plate having a bearing surface on its operating side formed with raised active wall portions and intervening open spaces with closed ends extending back from the surface to a backing portion, the wall portions, ends, and backing portion all being of approximately the same wall thickness from the open spaces.

2. A gib as set forth in claim 1, further characterized by the fact that the wall portions and open spaces are extensive in length along the bearing surface.

3. A gib as set forth in claim 2, further characterized by the fact that said open spaces are mainly aligned with the direction of movement along the gib.

References Cited in the file of this patent

UNITED STATES PATENTS

| | | |
|---|---|---|
| 2,004,254 | Taub | June 11, 1935 |
| 2,271,852 | Brumbach | Feb. 3, 1942 |
| 2,378,343 | Walter | June 12, 1945 |
| 2,393,967 | Brubaker | Feb. 5, 1946 |
| 2,479,653 | Walter | Aug. 23, 1949 |
| 2,635,930 | Daughtery | Apr. 21, 1953 |
| 2,675,276 | Daugherty | Apr. 13, 1954 |
| 2,772,259 | Hagemeyer | Nov. 27, 1956 |

FOREIGN PATENTS

| | | |
|---|---|---|
| 85,152 | Holland | May 15, 1957 |

OTHER REFERENCES

"Zytel" nylon resin, 1 pg. publication.

Modern Plastics Encyclopedia, published in 1956 by Plastics Catalogue Corp., Bristol, Conn., pages 130, 131.